United States Patent
Bazot et al.

(10) Patent No.: US 7,475,146 B2
(45) Date of Patent: Jan. 6, 2009

(54) METHOD AND SYSTEM FOR ACCESSING INTERNET RESOURCES THROUGH A PROXY USING THE FORM-BASED AUTHENTICATION

(75) Inventors: Philippe Bazot, Vence (FR); Jean Jacques Legoll, Cagnes sur Mer (FR); Fabrice Livigni, Mougins (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/720,554

(22) Filed: Nov. 24, 2003

(65) Prior Publication Data
US 2004/0117493 A1 Jun. 17, 2004

(30) Foreign Application Priority Data
Nov. 28, 2002 (EP) .................... 02368128

(51) Int. Cl.
*G06F 15/16* (2006.01)
(52) U.S. Cl. .......................... 709/227; 726/8
(58) Field of Classification Search ......... 709/201–203, 709/229, 250, 227; 726/2–4, 8
See application file for complete search history.

(56) References Cited

U.S. PATENT DOCUMENTS 6,000,033 A * 12/1999 Kelley et al. ............... 726/8
6,006,333 A * 12/1999 Nielsen ..................... 726/8
6,161,139 A * 12/2000 Win et al. .................. 726/8

(Continued)

FOREIGN PATENT DOCUMENTS

EP 1126663 A2 * 8/2001

(Continued)

OTHER PUBLICATIONS

Samar, V., Single sign-on using cookies for Web applications, Jun. 16, 1999-Jun. 18, 1999, Enabling Technologies: Infrastructure for Collaborative Enterprises, 1999. (WET ICE '99) Proceedings. IEEE 8th International Workshops on, pp. 158-163.*

(Continued)

*Primary Examiner*—Jason Cardone
*Assistant Examiner*—Ajay Bhatia
(74) *Attorney, Agent, or Firm*—Norman L. Gundal; Hoffman Warnick LLC

(57) ABSTRACT

Data transmission system including a proxy connected to the Internet network and at least a content server to which a user can gain access by the intermediary of the proxy, the proxy being associated with authentication means adapted to perform form-based authentication of the user when receiving a user request for Internet resources therefrom and wherein the proxy transmits the user request to the content server which sends back a response to the proxy. The authentication means comprise a Single Sign-On (SSO) server adapted to obtain a login form from the content server when receiving the user request from the proxy, to fill the login form by using the credentials associated with the user and to send back the filled login form thereby, playing the role of the user regarding the content server, so that the content server can provide the requested information after authentication of the user.

6 Claims, 3 Drawing Sheets

U.S. PATENT DOCUMENTS

| | | | |
|---|---|---|---|
| 6,161,182 A * | 12/2000 | Nadooshan | 726/8 |
| 6,182,229 B1 * | 1/2001 | Nielsen | 726/8 |
| 6,496,855 B1 * | 12/2002 | Hunt et al. | 726/8 |
| 6,609,198 B1 * | 8/2003 | Wood et al. | 726/8 |
| 6,938,158 B2 * | 8/2005 | Azuma | 713/182 |
| 2002/0078386 A1 * | 6/2002 | Bones et al. | 713/202 |
| 2002/0156905 A1 * | 10/2002 | Weissman | 709/229 |
| 2003/0149781 A1 * | 8/2003 | Yared et al. | 709/229 |
| 2004/0003081 A1 * | 1/2004 | Justus et al. | 709/225 |
| 2004/0117493 A1 * | 6/2004 | Bazot et al. | 709/229 |
| 2004/0123144 A1 * | 6/2004 | Chan et al. | 713/201 |
| 2005/0015490 A1 * | 1/2005 | Saare et al. | 709/225 |

FOREIGN PATENT DOCUMENTS

| | | | |
|---|---|---|---|
| WO | WO 2005003934 A1 * | 1/2005 | |

OTHER PUBLICATIONS

Volchkov, A., "Revisiting single sign-on: a pragmatic approach in a new context ," IT Professional, vol. 3, No. 1, pp. 39-45, Jan./Feb. 2001.*

Butler, R.; Welch, V.; Engert, D.; Foster, I.; Tuecke, S.; Volmer, J.; Kesselman, C., "A national-scale authentication infrastructure," Computer , vol. 33, No. 12, pp. 60-66, Dec. 2000.*

The Development of Open, Federated Specifications for Network Identity, Information Security Technical Reportvol. 7, Issue 3, , Sep. 2002, pp. 55-64.*

Samar, V., "Single sign-on using cookies for Web applications," Enabling Technologies: Infrastructure for Collaborative Enterprises, 1999. (WET ICE '99) Proceedings. IEEE 8th International Workshops on , vol., no., pp. 158-163, 1999.*

Wege, C., "Portal server technology," Internet Computing, IEEE , vol. 6, No. 3, pp. 73-77, May/Jun. 2002.*

Stal, M. 2002. Web services: beyond component-based computing. Commun. ACM 45, 10 (Oct. 2002), 71-76.*

Andreas Pashalidis and Chris J. Mitchell, A Taxonomy of Single Sign-On Systems, Lecture Notes in Computer Science, Wednesday, Jan. 1, 2003, Springer Berlin / Heidelberg.*

Free On-line Dictionary of Computing, define: "Magic cookie", (Jan. 25, 1995), http://foldoc.org.*

Botzum, K., Single Sign On—A Contrarian View, IBM. Aug. 2001.*

* cited by examiner

METHOD AND SYSTEM FOR ACCESSING INTERNET RESOURCES THROUGH A PROXY USING THE FORM-BASED AUTHENTICATION

TECHNICAL FIELD

The present invention relates to an Internet environment wherein a user addresses requests for Internet resources to a proxy which transmits these requests to a content server able to provide the Internet resources, and relates in particular to a method and system for accessing Internet resources through a proxy using form-based authentication.

BACKGROUND

The service provider market has moved up the value chain from pure connectivity services to deliver value-added and revenue generating services. The business model of a service provider, which was initially driven by minutes of use, is being increasingly replaced by data traffic, generated by users that access either internal services owned and maintained by the service provider itself or external services not maintained by the service provider but accessed through the service provider platform. In addition to growing their customer bases, service providers are now looking to increase the average revenue per user to boost revenues. More compelling services such as content, commerce, and other applications promise higher profit margins, improved customer retention, and greater customer satisfaction. However, managing and distributing these third-party services or content services present significant challenges to service providers. Therefore, the service provider plays a key role since it is the intermediary between the end-user and the internal or external services. Its privileged position allows the service provider to not only provide just "simple" access but added value services such as security, single sign-on, billing, location, etc. at the condition that it cannot be "bypassed" by the user.

In most cases, external services and partners that provide resources will do it for authenticated users only, meaning that they maintain and enforce the authentication and authorization of these users using their own user registry. Therefore, multiple authentication points may exist thus requiring the end-user to maintain multiple user IDs and passwords, and be prompted to authenticate multiple times in order to be able to access his personalized services. Obviously, this represents a fastidious step for the end-user to enter several times username(s)/password(s) in order to access the Web services. As such, the service provider might loose any credibility towards its end-users if it does not provide a solution to this problem. A solution is to provide a "Single Sign On" feature to their end-users giving them the possibility to use the same User Id and password for all services, whether internal or external, that require authentication. With this feature, user authentication only needs to be done once to access services requiring a user Id and password.

At connection time, the service provider asks the end-user to identify himself as an authorized user by responding to a username/password prompt displayed on the user device in order to give end-users the benefit of personalized services and resources according to the end-users choices and preferences. As already mentioned, these personalized services and resources can be either internal services managed and maintained by the service provider or external services provided by content provider partners.

The service providers and content providers partners have to come to an agreement on how end-user credentials should be passed from the service provider to the partners. The HTTP protocol is the transport protocol used for each communication involved, in one hand in the exchanges between the device being used to access the internal or external services provided by the service provider which is typically a Web browser and the service provider platform, and in other hand between the service provider and its service and the partners. Different techniques exist today such as the Basic HTTP Authentication exchange defined in the HTTP standard, HTTP cookies, customized HTTP headers, etc. These techniques can be used to perform such integration around a single sign-on. Unfortunately, these solutions require business development and cost on each side if partners are to directly trust the authentication done by the service provider platform.

The service provider is the intermediary between the end-user and the internal or external services. Thanks to its privileged position, the service provider uses in most cases an HTTP proxy component deployed in its infrastructure, which all end-users must go through, and which acts as a central authentication point for all end-users who wish to access personalized internal and external services and resources.

Two well known and spread authentication methods on the Internet are the HTTP Basic Authentication and forms-based authentication (e.g., an HTML form sent to the end-user prompting the user to enter a username/password), both over a normal or secure encrypted connection. Although performing single sign-on with Basic Authentication is relatively easy (and most of the HTTP proxies in the market already support single sign-on to back-end application servers representing external services or content provider partners using the HTTP Basic Authentication as described in the HTTP specification) most servers choose not to use it as a means of authentication, primarily because the user interface is unsophisticated and set by the Web browser and also because it is limited to a single hostname. Forms-based authentication is much more widely used because it is more flexible. Unfortunately, it is this very flexibility that makes single sign-on to form-based systems so difficult to handle insofar as the forms being used are various and different in function of the servers, thereby requiring a development cost.

SUMMARY OF THE INVENTION

Accordingly, the main object of the invention is to provide a method and a system allowing service providers to reduce the cost of development to perform single sign-on in case of partners using a form-based authentication, thereby avoiding any additional development effort and cost on both sides (service providers and partners).

The invention relates therefore to a method for accessing Internet resources provided by at least a content server in a data transmission system including a proxy connected to the Internet network, the proxy being adapted to perform form-based authentication of a user when receiving a user request for Internet resources therefrom, and wherein the proxy transmits the user request to the content server which sends back a response to the proxy. Such a method comprises the following steps:

transmission from said proxy to a Single Sign On (SSO) Server of the user request together with credentials associated with the user, filling by the SSO server of a login form obtained from the content server, the form being filled using the credentials, transmission by the content server to the SSO server of a response to the user request after receiving the filled login form from the SSO server, this response being then sent back to the proxy and, transmission by the proxy of the requested information to the user, the information being contained in the response received by the proxy.

According to another aspect, the invention relates to a data transmission system including a proxy connected to the Internet network and at least a content server to which a user can gain access through the proxy, the proxy being associated with authentication means adapted to perform form-based authentication of the user when receiving a user request for Internet resources therefrom and wherein the proxy transmits the user request to the content server which sends back a response to the proxy. The authentication means comprise a Single Sign-On (SSO) server adapted to obtain a login form from the content server when receiving the user request from the proxy, to fill the login form using the credentials associated with the user, and to send back the filled login form to the content server, so that the content server can provide the requested information after authentication of the user.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
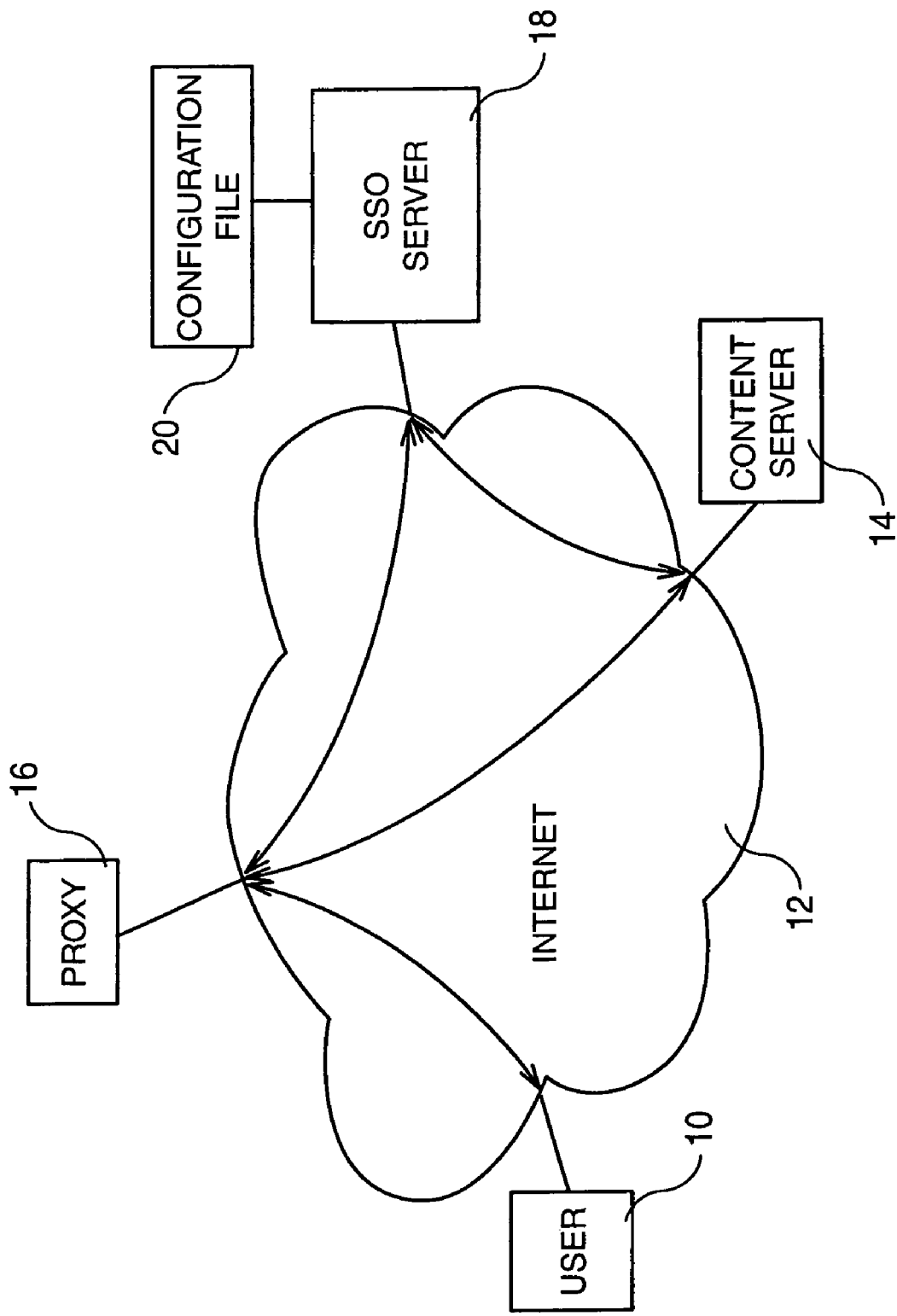
FIG. 1 is a schematic block-diagram showing a data transmission system according to the invention.

Referring to FIG. 1, representing a data transmission system used in the context of the invention, a service provider provides Web services to a plurality of users such as user 10 through the Internet network 12. Such web services can be any kind of information which can be furnished by a content server 14. When the user wants to access the content server, the user transmits a request to a proxy 16. Proxy 16 has at its disposal a user registry (not shown) containing information such as the credentials of the users allowed to access the services provided by the service provider (generally the identification and password of the user).

The proxy 16 is connected to a Single Sign-on (SSO) server 18 which is deployed in the service provider platform in order to recognize when a login form is presented and to interpret it and respond accordingly. For this, the SSO server 18 has at its disposal a configuration file 20 which provides details about signing on to the content server 14. The role of the configuration file 20 is to specify the URL of the login page into the server 14, the location of the login page, the name of the input field used for "username" and the name of the input field used for "password".

In a preferred embodiment of the invention, the SSO Server 18 is an additional component, external to the proxy 16, and does not assume any specific behavior different from the standard behavior that every proxy should implement. However, it could also be closely integrated within the proxy 16 itself, thus providing additional advantages (fewer components, no need for specific service entry point URL) at the additional cost of developing the functionality described in the invention inside it.

Figure 2:
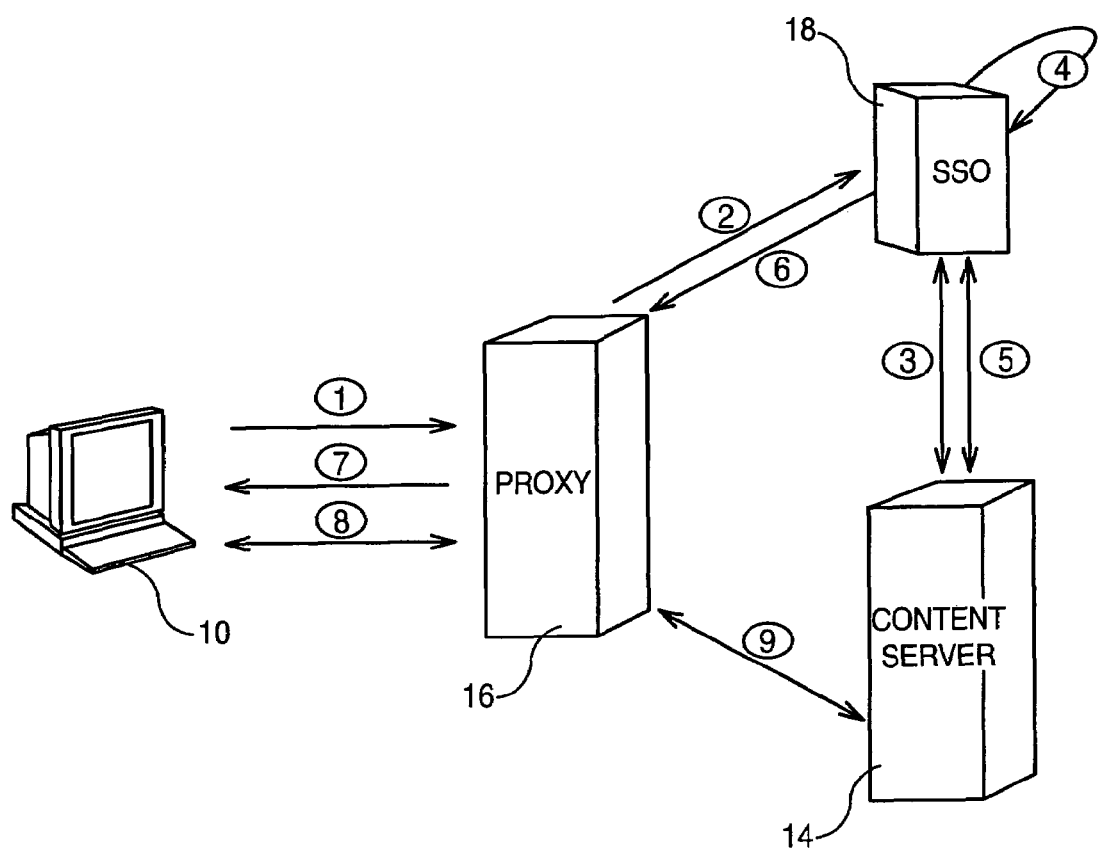
FIG. 2 is a schematic block-diagram representing the different data flows achieved between the elements of the data transmission system illustrated in FIG. 1.

The diagram in FIG. 2 illustrates the steps achieved in the method in accordance with the present invention. These steps include the following:

1) The user 10 logs on to the HTTP proxy 16. The user 10 accesses the back-end application service in content server 14 by clicking a specific URL provided by the service provider that identifies the service entry point and references to SSO server 18.

2) Upon reception of this request, the HTTP proxy 16 passes the user's authentication information to the SSO server 18 (e.g., a standard HTTP authorization header credential such as the authorization HTTP header described in the HTTP specification).

3) The SSO server 18 generates a GET request using the information from its configuration file 20, sends it to the content server 14 and obtains the custom login page and any session information such as cookies.

4) The SSO server 18 filters the login form and, using information from its configuration file 20, fills in the username/password (together with any hidden fields, data, and session cookies).

5) The SSO server 18 generates a POST request and transmits it to the content server 14. The content server 14 authenticates the request and returns the result (plus session information if any) back to the SSO server 18.

6) The SSO server 18 sends the HTTP response and any session information to the HTTP proxy 16.

7) The HTTP proxy 16 forwards this information back to the user 10.

8)-9) All subsequent requests to the content server 14 are routed across the standard junction to the content server 14 (a junction is a configuration rule that exists in the proxy 16 to handle the connection between the proxy 16 and the content server 14).

Figure 3:
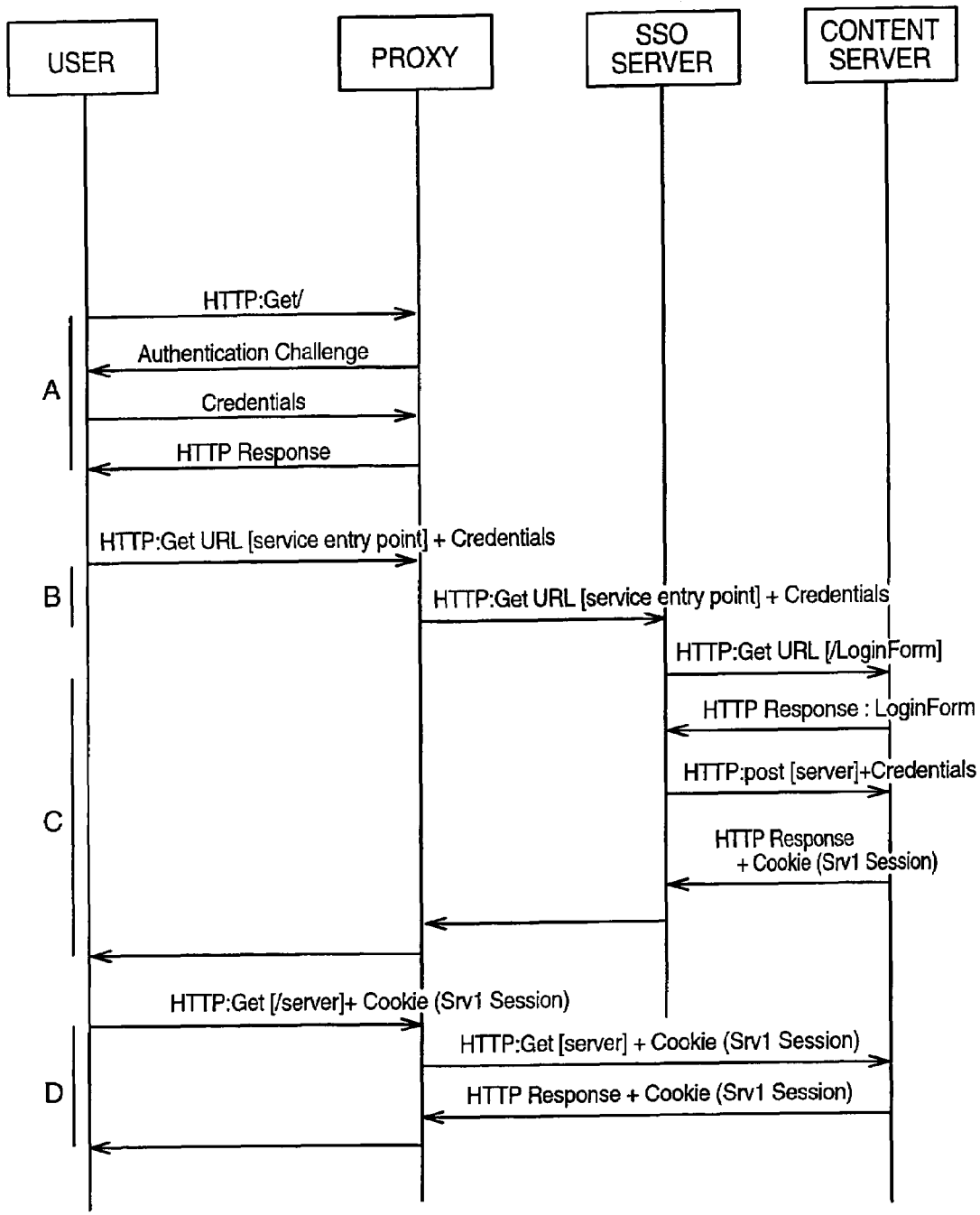
FIG. 3 is a diagram illustrating the flows being achieved for each kind of request transmitted by the user to the proxy in the data transmission system illustrated in FIG. 1.

The data flows corresponding to the different kinds of requests transmitted from the user are represented in FIG. 3.

A. First request issued by the user

The user 10 sends the first request to the HTTP proxy 16, invoking the external URL configured in the proxy 16 (/). Since the invoked URL is protected, the proxy 16 sends an authentication challenge to the user 10. Different methods can be used to send this challenge (HTTP response code 401, a form, etc.). This is independent from the authentication technique required by the back-end servers. The user 10 responds with his/her credentials (typically a user name and password). The proxy 16 verifies these credentials against its user registry, and accepts them if they correspond to a valid user. It returns a HTTP response to the user 10.

B. Processing of the HTTP request to the content server

The user 10 now sends a request towards a back-end service in the content server 14. From the invoked URL, the proxy 16 reroutes this request to the SSO server 18, augmented by the user credentials (such as the HTTP Authorization Header) collected in step A. The SSO server 18 will then play the role of the user 10 with regard to the content server 14.

C. Content server authentication procedure

The SSO server 18 invokes the login form configured for the content server 14, and the content server 14 responds with the login form. The SSO server 18 "fills in the form", and posts the user credentials to the content server 14. Since these credentials are valid, the content server 14 sends back an HTTP response to the SSO server 18, potentially augmented by a session cookie, specific to the content server 14. The content of this cookie is opaque to the SSO server 18 and to the proxy 16, and will allow the content server 14 to verify, on subsequent requests, that this user 10 has been properly identified. Cookies are important in a form-based login environment because they are often used by the server to identify the user's session. Obviously, precautions have to be taken around the Internet domain and the cookies, because a cookie will be replayed by a Web browser if it matches the Internet domain of the HTTP requests submitted. Optionally this response can be combined with a redirection towards the content server 14, which will allow subsequent requests to flow directly either from the proxy 16 to the content server 14, bypassing the SSO Server 18, or from the user 10 directly to the content server 14. The SSO server 18 forwards this response back to the proxy 16, and then to the user 10.

D. Subsequent requests

The proxy 16 forwards subsequent requests directly to the content server 14, without going through the SSO server 18. In each request the user repeats the content server 14 session cookie (if any), which is used by the content server 14 to retrieve the user context.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. Method for accessing Internet resources provided by a content server in a data transmission system including an HTTP proxy connected to the Internet network, said HTTP proxy being adapted to perform form-based authentication of a user when receiving a user request for Internet resources therefrom, and wherein said proxy transmits the user request to said content server which sends back a response to the proxy; said method comprising:

receiving a user request from a user for Internet resources at an HTTP proxy;

transmission from said proxy to a Single Sign On (SSO) server of said user request together with credentials associated with said user, wherein said SSO server is external to and accessible via the Internet to said HTTP proxy, obtaining by the SSO server a login form from the content server, wherein said SSO server has at its disposal a configuration file for obtaining and filling said login form, said configuration file providing information about said content server, filling by said SSO server of the login form obtained from said content server, said login form being filled by the SSO server using said credentials, transmission from the SSO server to the content server of the filled login form, transmission by said content server to said SSO server of an HTTP response to said user request after the content server receives the filled login form from said SSO server, wherein any session cookie augmenting the HTTP response is opaque to the SSO server and the HTTP proxy allowing the content server to verify proper identification of the user upon a subsequent request, sending of the HTTP response back to the HTTP proxy by the SSO server and, transmission by said HTTP proxy of the requested information to said user, said information being contained in said HTTP response, wherein subsequent user requests are forwarded directly from the HTTP proxy to the content server, and HTTP responses to the subsequent user requests are transmitted directly to the proxy by the content server, without going through the SSO server.

2. Method according to claim 1, wherein the configuration file includes information including at least one of an URL of a login page, a location of said login page, a name of an input field used for a username and a name of an input field used for a password.

3. Method according to claim 1, wherein said HTTP response from said content server sent back to said HTTP proxy includes at least one cookie specific to said content server.

4. Method according to claim 1, further comprising an initial step of transmitting by said user a first request to said HTTP proxy invoking an external URL configured in said HTTP proxy, said HTTP proxy sending back an authentication challenge to said user in order to verify the user credentials and checking whether the user credentials correspond to a valid user.

5. Data transmission system including a HTTP proxy connected to the Internet network and a content server to which a user can gain access through said HTTP proxy, said HTTP proxy being associated with authentication means adapted to perform form-based authentication of the user when receiving a user request for Internet resources therefrom and wherein said HTTP proxy transmits the user request to said content server which sends back a HTTP response to said HTTP proxy; said authentication means comprising:

a Single Sign-On (SSO) server adapted to receive from the HTTP proxy a user request and credentials associated with the user, to obtain a login form from said content server when receiving said user request from said HTTP proxy, to fill in said login form using the credentials associated with said user, and to send back the filled login form to said content server, so that said content server can provide the requested information to the HTTP proxy after authentication of said user, wherein said SSO server has at its disposal a configuration file for obtaining and filling said login form, said configuration file providing information about said content server such as the URL of the login page, wherein said SSO server is external to and accessible via the Internet to said HTTP proxy, wherein subsequent user requests are forwarded directly from the HTTP proxy to the content server, and HTTP responses to the subsequent user requests are transmitted directly to the HTTP proxy by the content server, without going through the SSO server, wherein any session cookie augmenting the HTTP response is opaque to the SSO server and the HTTP proxy allowing the content server to verify proper identification of the user upon a subsequent request.

6. Data transmission system according to claim 5, wherein the configuration file includes information including at least one of an URL of a login page, a location of said login page, a name of an input field used for a username and a name of an input field used for a password.

* * * * *